United States Patent
Pyun

(10) Patent No.: US 8,820,334 B2
(45) Date of Patent: Sep. 2, 2014

(54) APPARATUS FOR HEATING WASHER LIQUID

(75) Inventor: Hyun Joong Pyun, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 946 days.

(21) Appl. No.: 12/956,379

(22) Filed: Nov. 30, 2010

(65) Prior Publication Data

US 2012/0048309 A1 Mar. 1, 2012

(30) Foreign Application Priority Data

Aug. 31, 2010 (KR) .................. 10-2010-0084903

(51) Int. Cl.
*B60S 1/48* (2006.01)
*B60H 1/00* (2006.01)
*B60H 1/22* (2006.01)

(52) U.S. Cl.
CPC ............. *B60S 1/487* (2013.01); *B60H 1/00271* (2013.01); *B60H 1/2215* (2013.01); *B60S 1/481* (2013.01)
USPC .......................................... 134/105; 134/198

(58) Field of Classification Search
CPC ...................................................... B60S 1/488
USPC ............................................... 134/105, 107
See application file for complete search history.

(56) References Cited

U.S. PATENT DOCUMENTS

| 3,787,659 | A | * | 1/1974 | Olland | 392/450 |
| 3,833,170 | A | * | 9/1974 | Marshall | 236/9 R |
| 5,354,965 | A | * | 10/1994 | Lee | 219/202 |
| 6,124,570 | A | * | 9/2000 | Ebner et al. | 219/202 |
| 7,445,165 | B2 | * | 11/2008 | Franco et al. | 239/284.1 |
| 2007/0295825 | A1 | * | 12/2007 | McNaughton | 237/12.3 B |
| 2009/0227194 | A1 | * | 9/2009 | Johnston | 454/152 |

* cited by examiner

*Primary Examiner* — Michael Barr
*Assistant Examiner* — Spencer Bell
(74) *Attorney, Agent, or Firm* — Morgan, Lewis & Bockius LLP

(57) ABSTRACT

An apparatus for heating washer liquid, may include a PTC ("Positive Temperature Coefficient") heater provided in an air conditioning system of a vehicle, a subsidiary washer tank connected to a washer tank of the vehicle, and divided into a non-heated washer-liquid storage space for storing non-heated washer liquid received from the washer tank and a heated washer-liquid storage space for storing washer liquid which may be heated, a washer liquid circulation pump provided on the subsidiary washer tank, feeding the non-heated washer liquid into the PTC heater, and recovering the heated washer liquid to the heated washer-liquid storage space of the subsidiary washer tank, a washer liquid heating pipe fluid-connected to the washer liquid circulation pump and provided to pass through a heat radiation fin of the PTC heater so that the non-heated washer liquid fed by the washer liquid circulation pump may be selectively heated by the heat radiation fin provided in the PTC heater, and a washer liquid spray pump feeding the heated washer liquid, which may be stored in the heated washer-liquid storage space, to a spray nozzle.

4 Claims, 3 Drawing Sheets

APPARATUS FOR HEATING WASHER LIQUID

CROSS-REFERENCE TO RELATED APPLICATIONS

The present application claims priority to Korean Patent Application No. 10-2010-0084903 filed on Aug. 31, 2010, the entire contents of which is incorporated herein for all purposes by this reference.

BACKGROUND OF THE INVENTION

1. Field of the Invention

The present invention relates to a washer liquid heating apparatus, which is capable of heating washer liquid in a short period of time without affecting other electronic components of a vehicle.

2. Description of Related Art

Generally, a vehicle is equipped with a wiper which cleans the windshield glass to ensure a clear view. Washer liquid is used in order to enhance the cleaning effect. The washer liquid is sprayed on the glass using a spray nozzle which is provided at a position around the wiper.

However, if the washer liquid is used in a cold winter, the washer liquid sprayed on the glass is problematic in that it does not effectively remove frost and impurities from the glass, but the washer liquid sprayed on the glass may freeze, thus frequently obstructing a driver's field of vision.

Therefore, in order to solve the problem, an apparatus for heating washer liquid has been used to preheat the washer liquid. As one example, there has been proposed an apparatus which is constructed so that a coolant having high temperature is circulated in a washer tank which stores washer liquid therein to primarily heat the washer liquid stored in the washer tank, and a small-sized heater is installed in a spray nozzle which sprays the washer liquid to secondarily heat the washer liquid. As another example, there has been proposed an apparatus which is constructed so that an additional washer liquid heater is installed between the washer tank and the spray nozzle to heat washer liquid before it is sprayed by the spray nozzle.

However, the former washer liquid heating apparatus is problematic in that it takes a long time to heat the washer liquid. The latter washer liquid heating apparatus is advantageous in that it can heat washer liquid in a short period of time, but is disadvantageous in that there is a danger of a fire and power consumption is high when the washer liquid is heated, thus negatively affecting other electronic components of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for heating washer liquid, which heats washer liquid using a PTC ("Positive Temperature Coefficient") heater used in an air conditioning system of a vehicle and has a subsidiary washer tank to store heated washer liquid, thus enabling washer liquid to be heated in a short period of time, without negatively affecting other electronic components of the vehicle when the washer liquid is being heated.

In an aspect of the present invention, the apparatus for heating washer liquid may include a PTC ("Positive Temperature Coefficient") heater provided in an air conditioning system of a vehicle, a subsidiary washer tank connected to a washer tank of the vehicle, and divided into a non-heated washer-liquid storage space for storing non-heated washer liquid received from the washer tank and a heated washer-liquid storage space for storing washer liquid which may be heated, a washer liquid circulation pump provided on the subsidiary washer tank, feeding the non-heated washer liquid into the PTC heater, and recovering the heated washer liquid to the heated washer-liquid storage space of the subsidiary washer tank, a washer liquid heating pipe fluid-connected to the washer liquid circulation pump and provided to pass through a heat radiation fin of the PTC heater so that the non-heated washer liquid fed by the washer liquid circulation pump may be selectively heated by the heat radiation fin provided in the PTC heater, and a washer liquid spray pump feeding the heated washer liquid, which may be stored in the heated washer-liquid storage space, to a spray nozzle.

The PTC heater may be divided into a synchronous heating area which may be equipped with the washer liquid heating pipe to simultaneously heat washer liquid and air for heating the vehicle, and an air heating area which may be not equipped with the washer liquid heating pipe to heat only air for heating the vehicle, wherein the synchronous heating area and the air heating area of the PTC heater may be independently controlled.

The PTC heater may include a PTC device generating heat when power may be applied thereto, a bar-shaped tube provided on each of opposite sides of the PTC device to serve as a housing, the heat radiation fin coming into contact with the tube to radiate heat which may be transferred from the PTC device to the tube, and an insulator provided between the tube and the heat radiation fin, and protecting electronic components of the PTC heater when washer liquid leaks from the washer liquid heating pipe which passes through the heat radiation fin.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described in detail with reference to the accompanying drawings.

Figure 1:
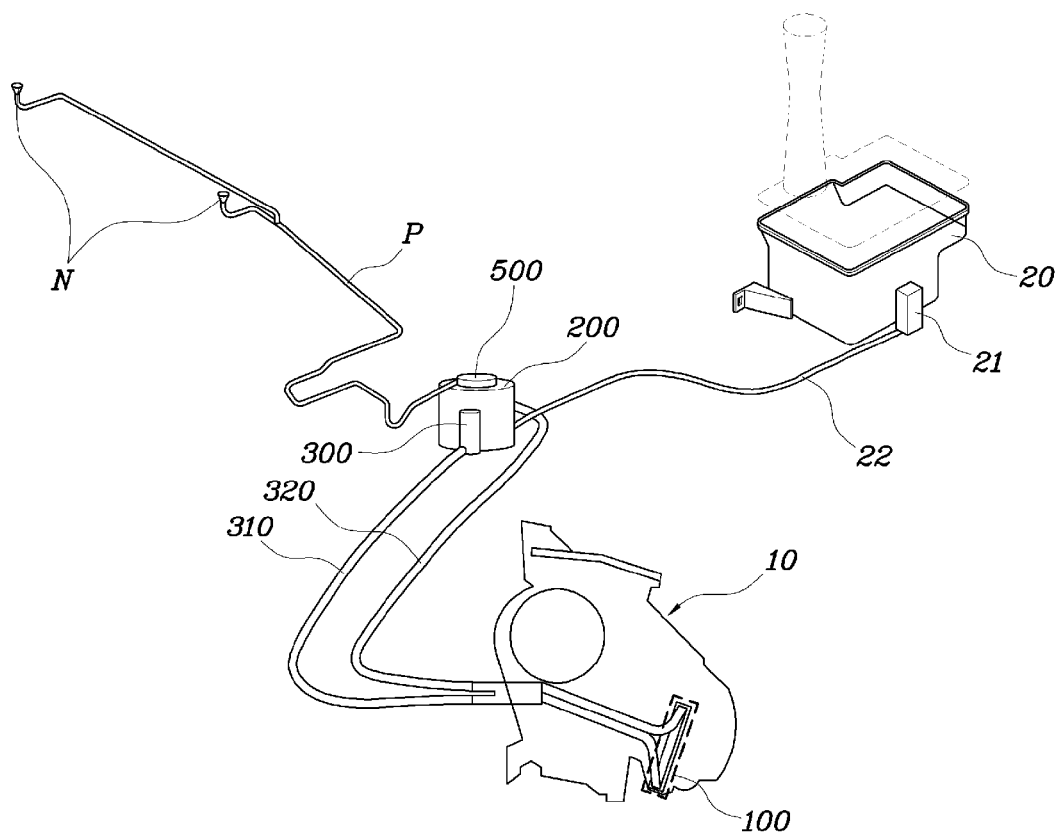
FIG. 1 is a view showing an apparatus for heating washer liquid according to an exemplary embodiment of the present invention.
Figure 2:
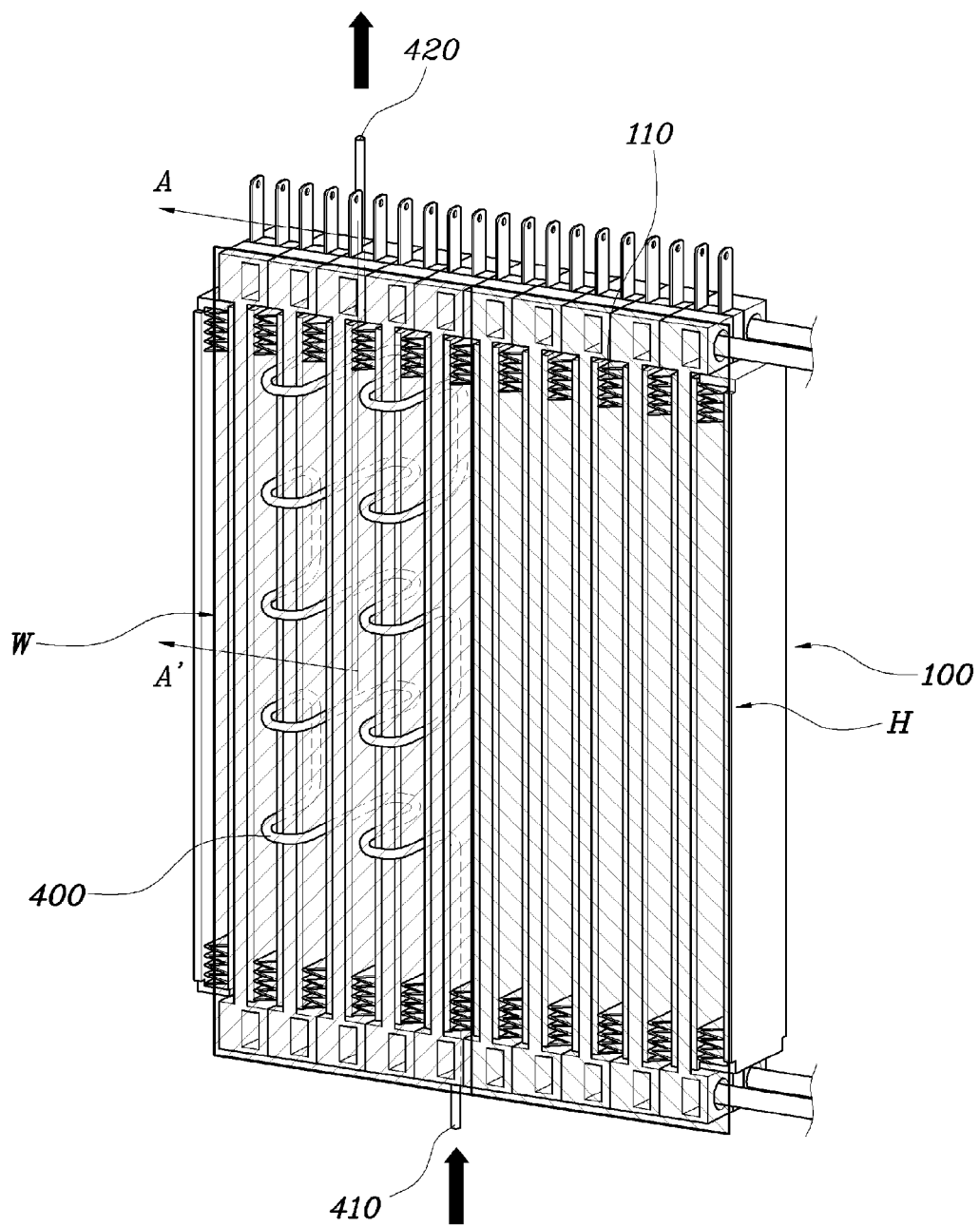
FIG. 2 is a view showing a PTC heater and a washer liquid heating pipe applied to the exemplary embodiment of the present invention.
Figure 3:
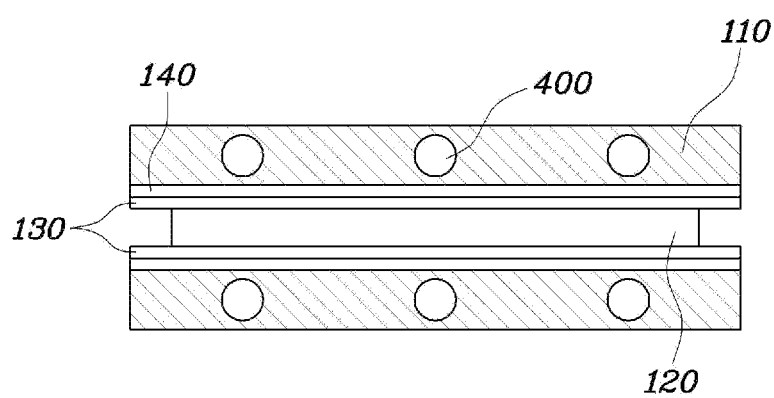
FIG. 3 is a sectional view taken along line A-A' of FIG. 2.

Referring to FIGS. 1 to 3, an apparatus for heating washer liquid according to the exemplary embodiment of the present invention includes a PTC heater 100, a subsidiary washer tank 200, a washer liquid circulation pump 300, a washer liquid heating pipe 400, and a washer liquid spray pump 500.

The PTC heater 100 is installed in an air conditioning system 10 of a vehicle, and is used as a subsidiary heater or main heater depending on the type of vehicle. It is preferable to use a high voltage PTC heater to heat washer liquid in a short period of time without affecting other electronic components of the vehicle.

The subsidiary washer tank 200 is additionally provided to receive a predetermined amount of washer liquid which is supplied from a washer pump 21 provided on a washer tank 20 of the vehicle and to store the heated washer liquid when the supplied washer liquid is heated by being circulated in the PTC heater 100. The subsidiary washer tank 200 is divided into a non-heated washer-liquid storage space which stores non-heated washer liquid therein and a heated washer-liquid storage space which stores heated washer liquid therein.

The washer liquid circulation pump 300 is mounted to the subsidiary washer tank 200. The washer liquid circulation pump 300 feeds non-heated washer liquid, which is stored in the non-heated washer-liquid storage space, through a feeding pipe 310 to the washer liquid heating pipe 400 installed in the PTC heater 100, and then recovers the washer liquid through a recovery pipe 320. An inlet 410 of the washer liquid heating pipe 400 is connected to the feeding pipe 310, while an outlet 420 of the washer liquid heating pipe 400 is connected to the recovery pipe 320.

The washer liquid heating pipe 400 is installed in the PTC heater 100. In detail, the washer liquid heating pipe 400 passes through heat radiation fins 110 of the PTC heater 100, as shown in FIG. 2.

Meanwhile, the structure of the PTC heater 100 in which the washer liquid heating pipe 400 is installed will be described below in detail with reference to FIG. 3. The PTC heater 100 includes a PTC device 120 which generates heat when power is applied thereto. Bar-shaped tubes 130 are provided on the opposite sides of the PTC device 120 to serve as a housing. The heat radiation fin 110 is in contact with the tube 130 to radiate heat which is transferred from the PTC device 120 to the tube 130. An insulator 140 is provided between the tube 130 and the heat radiation fin 110 to protect the electronic components of the PTC heater 100 when washer liquid leaks from the washer liquid heating pipe 400 that passes through the heat radiation fins 110.

Meanwhile, the PTC heater 100 is divided into a synchronous heating area W and an air heating area H. The synchronous heating area W is equipped with the washer liquid heating pipe 400 to simultaneously heat washer liquid and air for heating the vehicle. Meanwhile, the air heating area H is not equipped with the washer liquid heating pipe 400 to heat only the air for heating the vehicle.

It is preferable to independently control the synchronous heating area W and the air heating area H of the PTC heater 100. The reason for this is as follows. That is, when a user desires to heat only the washer liquid, it is unnecessary to apply power to the entire PTC heater 100, thus reducing power consumption, therefore lessening the negative effect on other electronic components of the vehicle.

Hereinafter, the operation of the washer liquid heating apparatus according to the exemplary embodiment of the present invention will be described.

Washer liquid stored in the washer tank 20 of the vehicle is fed along a washer liquid feeding pipe 22 to the subsidiary washer tank 200 by the washer pump 21. The fed washer liquid is stored in the non-heated washer-liquid storage space which is provided in the subsidiary washer tank 20 to store non-heated washer liquid.

When the washer liquid circulation pump 300 feeds non-heated washer liquid, which is stored in the non-heated washer-liquid storage space, through the feeding pipe 310 to the washer liquid heating pipe 400 installed in the PTC heater 100, the washer liquid is heated by the PTC heater 100 while it passes through the washer liquid heating pipe 400.

The washer liquid, which is heated while passing through the washer liquid heating pipe 400, is fed through the recovery pipe 320 to the subsidiary washer tank 200. The fed washer liquid is stored in the heated washer-liquid storage space which is provided in the subsidiary washer tank 200 to store the heated washer liquid.

The heated washer liquid which is stored in the heated washer-liquid storage space is fed to spray nozzles N via the washer liquid spray pump 500 which is provided on the subsidiary washer tank 20, and is sprayed on the glass of the vehicle.

As described above, when the washer liquid heating apparatus according to the exemplary embodiment of the present invention is applied to a vehicle, the PTC heater used in the air conditioning system of the vehicle heats a predetermined amount of washer liquid, and the heated washer liquid is separately stored in the subsidiary washer tank, thus preventing heated washer liquid from mixing with non-heated washer liquid, therefore enabling the washer liquid to be efficiently heated. Further, since the high voltage PTC heater is used to heat a predetermined amount of washer liquid, the washer liquid may be heated in a short period of time. Furthermore, power is applied to only a predetermined area of the PTC heater when the washer liquid is heated, thus allowing the power of the vehicle to be efficiently used, therefore preventing other electronic components from being negatively affected by excessive power consumption.

As described above, the present invention provides an apparatus for heating washer liquid, which heats washer liquid using a PTC heater used in an air conditioning system of a vehicle and has a subsidiary washer tank to store heated washer liquid, thus enabling washer liquid to be heated in a short period of time, without negatively affecting other electronic components of the vehicle when the washer liquid is being heated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An apparatus for heating washer liquid, comprising:
    a PTC ("Positive Temperature Coefficient") heater provided in an air conditioning system of a vehicle;
    a subsidiary washer tank connected to a washer tank of the vehicle, and divided into a non-heated washer-liquid storage space for storing non-heated washer liquid received from the washer tank and a heated washer-liquid storage space for storing washer liquid which is heated;
    a washer liquid circulation pump provided on the subsidiary washer tank, feeding the non-heated washer liquid into the PTC heater, and recovering the heated washer liquid to the heated washer-liquid storage space of the subsidiary washer tank;
    a washer liquid heating pipe fluid-connected to the washer liquid circulation pump and provided to pass through a heat radiation fin of the PTC heater so that the non-heated washer liquid fed by the washer liquid circulation pump is selectively heated by the heat radiation fin provided in the PTC heater; and
    a washer liquid spray pump feeding the heated washer liquid, which is stored in the heated washer-liquid storage space, to a spray nozzle;
    wherein the PTC heater is divided into a synchronous heating area which is equipped with the washer liquid heating pipe to simultaneously heat washer liquid and air for heating the vehicle, and an air heating area which is not equipped with the washer liquid heating pipe to heat only air for heating the vehicle.

2. The apparatus as set forth in claim 1, wherein the synchronous heating area and the air heating area of the PTC heater are independently controlled.

3. The apparatus as set forth in claim 2, wherein the PTC heater comprises:
    a PTC device generating heat when power is applied thereto;
    a bar-shaped tube provided on each of opposite sides of the PTC device to serve as a housing;
    the heat radiation fin coming into contact with the tube to radiate heat which is transferred from the PTC device to the tube; and
    an insulator provided between the tube and the heat radiation fin and protecting electronic components of the PTC heater when washer liquid leaks from the washer liquid heating pipe which passes through the heat radiation fin.

4. The apparatus as set forth in claim 1, wherein the PTC heater comprises:
    a PTC device generating heat when power is applied thereto;
    a bar-shaped tube provided on each of opposite sides of the PTC device to serve as a housing;
    the heat radiation fin coming into contact with the tube to radiate heat which is transferred from the PTC device to the tube; and
    an insulator provided between the tube and the heat radiation fin and protecting electronic components of the PTC heater when washer liquid leaks from the washer liquid heating pipe which passes through the heat radiation fin.

* * * * *